United States Patent
Hreha et al.

(10) Patent No.: US 10,982,095 B1
(45) Date of Patent: *Apr. 20, 2021

(54) BIS-SCHIFF-BASE THERMOSETTING ELASTOMERS

(71) Applicant: Jalapeno Holdings, LLC, Bellbrook, OH (US)

(72) Inventors: Richard D. Hreha, Centerville, OH (US); Joel P. Brubaker, Dayton, OH (US); Frank M. Zalar, Beavercreek Township, OH (US); Michael D. Rauscher, Beavercreek, OH (US)

(73) Assignee: Jalapeno Holdings, LLC, Bellbrook, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,226

(22) Filed: Apr. 16, 2020

Related U.S. Application Data (63) Continuation of application No. 16/019,015, filed on Jun. 26, 2018, now Pat. No. 10,662,329.

(51) Int. Cl.
  *C08L 61/22* (2006.01)
  *C08L 83/04* (2006.01)
  (Continued)

(52) U.S. Cl.
  CPC .......... *C08L 83/04* (2013.01); *C08G 77/388* (2013.01); *C08G 77/445* (2013.01); *C08J 5/005* (2013.01);
  (Continued)

(58) Field of Classification Search
  None
  See application file for complete search history.

(56) References Cited

U.S. PATENT DOCUMENTS

| 3,945,999 A | 3/1976 | Graffaz et al. |
| 4,704,176 A | 11/1987 | Botzman |

(Continued)

FOREIGN PATENT DOCUMENTS

| CN | 104193706 B | 12/2014 |
| JP | 06271558 A | 9/1994 |

OTHER PUBLICATIONS

S. A. AbouEl-Enein, "Polymeric and Sandwich Schiff's Bases Complexes Derived from 4, 4'-Methylenedianiline, Characterization and thermal investigation", Journal of Thermal Analysis and Calorimetry, vol. 91, No. 3, pp. 929-936, 2008.

(Continued)

*Primary Examiner* — Robert S Loewe
(74) *Attorney, Agent, or Firm* — Dinsmore & Shohl LLP (57) ABSTRACT

Chemical compositions are provided having a structure in accordance with

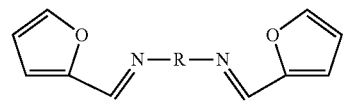

with the R group having a structure in accordance with (Formula II)

(Continued)

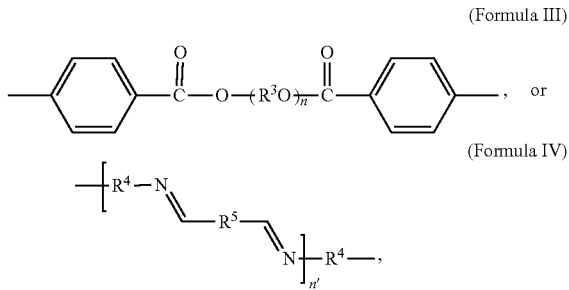

$R^1$ includes an alkyl group, $R^2$ includes an alkylene group, and $R^3$ includes an alkylene group in accordance with $(CH_2)_x$ with $x \geq 2$, and $R^4$ includes the structure of Formula (II) or Formula (III). $R^5$ includes a meta-substituted or para-substituted phenyl moiety. Additionally, elastomers produced by cross-linking the chemical composition of Formula (I) are provided.

19 Claims, 2 Drawing Sheets

(51) Int. Cl.
   *C08G 77/388* (2006.01)
   *C08G 77/445* (2006.01)
   *C08J 5/00* (2006.01)
   *C08J 5/04* (2006.01)
   *C08L 77/10* (2006.01)

(52) U.S. Cl.
   CPC ............... *C08J 5/047* (2013.01); *C08L 77/10* (2013.01); *C08J 2383/10* (2013.01); *C08J 2477/10* (2013.01); *C08L 2312/00* (2013.01)

(56) References Cited

U.S. PATENT DOCUMENTS

| | | |
|---|---|---|
| 6,552,155 B1 | 4/2003 | Gutman et al. |
| 8,592,498 B2 | 11/2013 | Enomura |
| 9,261,334 B1 | 2/2016 | Saint |
| 2015/0359134 A1 | 12/2015 | Soong et al. |
| 2015/0376153 A1 | 12/2015 | Masuno et al. |

OTHER PUBLICATIONS

Ahmed et al., "Thermal insulation by heat resistant polymers for solid rocket motor insulation", Journal of Composite Materials, vol. 46, No. 13, pp. 1549-1559, 2011.

Omyma A.M. Ali, "Palladium(III) and zinc(II) complexes of neutral [N2O2] donor Schiff bases derived from furfuraldehyde: Synthesis, characterization, fluorescence and corrosion inhibitors of ligands", Spectrochimica Acta Part A: Molecular and Biomolecular Spectroscopy, vol. 132, pp. 52-60, 2014.

Brunovska et al., "Thermal properties of phthalonitrile functional polybenzoxazines", Thermochimica Acta 357-358, pp. 195-203, 2000.

de Almedia et al., "Processing and characterization of ablative composites used in rocket motors", Journal of Reinforced Plastics and Composites, vol. 33, No. 16, pp. 1474-1484, 2014.

NASA, "Game Changing Development Program, Potential Industry/ NASA Partnership in the Development and Assessment of High Performance Thermal Protection System Materials", NNH15Z0A005L Mar. 2, 2015, NSPIRES, Jul. 3, 2015.

Natali et al., "Ablative properties of carbon black and MWNT/ phenolic composites: A comparative study", Composites, Part A 43, pp. 174-182, 2012.

Ogasawara et al., "Thermal Response and Ablation Characteristics of Carbon Fiber Reinforced Composite with Novel Silicon Containing Polymer MSP", Journal of Composite Materials, vol. 36, No. 2, pp. 143-157, 2002.

Parkar et al., "Ablation characteristics of an aromatic thermosetting copolyester/carbon fiber composite", Journal of Composite Materials, vol. 46(15), pp. 1819-1830, 2011.

Sabagh et al., "Thermochemical erosion and thermophysical properties of phenolic resin/carbon fiber/graphite nanocomposites", Journal of Reinforced Plastics and Composites, vol. 35(24), pp. 1814-1825, 2016.

Sandor, "PBI (Polybenzimidazole): Synthesis, Properties and Applications", High Performance Polymers, vol. 2, No. 1, pp. 25-37, 1990.

Wen et al., "Synthesis and acidochromic, electrochromic properties of Schiff bases containing furan and triphenylamine units", Synthetic Metals, 202, pp. 89-97, 2015.

Williams et al., "Thermal Protection Materials: Thermophysical Property Data", NASA Reference Publication 1289, 1992.

Yezzi et al., "Characterization of Kevlar/EPDM Rubbers for use as Rocket Motor Case Insulators", AIAA/ASME/SAE/ASEE 22nd Joint Propulsion Conference, AIAA-86-1489, Jun. 16-18, 1986.

Zhang et al., "Addition-curable phthalonitrile-functionalized novolac resin", High Performance Polymers, vol. 24(5), pp. 398-404, 2012.

Zhizhko et al., "Oxo/Imido Heteromethathesis Reactions Catalyzed by a Silica-Supported Tantalum Imido Complex", Organometallics 32, pp. 3611-3617, 2013.

Elections Restrictions pertaining to U.S. Appl. No. 15/440,829 dated Mar. 29, 2018.

Office Action pertaining to U.S. Appl. No. 15/440,829 dated Jun. 26, 2018.

BIS-SCHIFF-BASE THERMOSETTING ELASTOMERS

CROSS-REFERENCE TO RELATED APPLICATION

This application is a continuation application of U.S. patent application Ser. No. 16/019,015 filed Jun. 26, 2018, the entire disclosure of which is hereby incorporated herein by reference.

STATEMENT REGARDING FEDERALLY SPONSORED RESEARCH OR DEVELOPMENT

This invention was made with U.S. Government support under Contract No. W31P4Q-17-C-0032 awarded by U.S. Army to Cornerstone Research Group Inc. The U.S. Government has certain rights in the invention.

FIELD OF INVENTION

Embodiments of the present disclosure generally relate to bis-Schiff-base compositions and elastomers that include a bis-Schiff-base composition. More specifically, embodiments of the present disclosure relate to bis-Schiff base compositions and elastomers formed therefrom with improved thermal barrier properties.

BACKGROUND

Provision of insulation on parts in industrial applications is common. One such application is application of insulation materials on rocket motors. It will be appreciated that parts of a rocket motor experience elevated temperatures during operation, but it is critical to maintain temperature control on subcomponents including electronics, controls, and fuel storage. Currently, Kevlar® filled EPDM (EPDM/Kevlar) is traditionally used as insulation materials for numerous applications including insulation on rocket motors. The EPDM/Kevlar material offers low thermal conductivity, low-cost, and ease of integration with composite manufacturing techniques. However, an EPDM/Kevlar material erodes readily in use through thermal decomposition thereby requiring an increased thickness to retain structural integrity and insulative performance for the duration of a rocket motors operation cycle. The increased thickness translates to an increased mass of the insulation material required and a commensurate increase in total weight of the vehicle affixed to the rocket motor imparting performance degradation in terms of speed, range, and/or payload capacity.

Efforts have been made to supplement traditional EPDM/Kevlar with reinforcement including nanoclays, nanofibers, and other inorganic materials to improve thermal resistance and erosion. However, while such efforts have offered improvement they are still ultimately restrained by their flawed dependence on the same elastomer base in EPDM and its propensity for thermal erosion.

SUMMARY

Accordingly, a need exists for elastomers and composites form from said elastomers which provide thermal barrier properties and have a reduced susceptibility to thermal erosion in the presence of high heat flux and particle impingement. The thermal barrier protects the underlying surface from high heat fluxes in an erosive environment. This is typically achieved in the insulative elastomeric material by conversion of the surface to an erosion resistant carbon material while the underlying virgin material maintains its elastomeric and insulative properties. In an application such as a solid rocket motor, the thermal barrier coating also buffers the transmission of case strain into the propellant and serves as a pressure seal to prevent damage to the case from combustion products necessitating the virgin material have elastomeric properties. Development of bis-Schiff-base elastomers and elastomer composites provide higher thermal barrier properties, greater char yield, and slower erosion.

The present embodiments address these needs by providing chemical compositions, bis-Schiff-base elastomers produced from the chemical compositions, and bis-Schiff-base elastomer composites produced from the chemical compositions which exhibit superior thermal barrier properties and erosion reduction.

Embodiments of the present disclosure relate to chemical compositions having the structure of Formula (I):

Formula (I)

wherein:

R comprises the structure of Formula (II), Formula (III), or Formula (IV):

Formula (II)

wherein, $R^1$ comprises an alkyl group and $R^2$ comprises an alkylene group;

Formula (III)

wherein, $R^3$ comprises an alkylene group in accordance with $(CH_2)_x$ with $x \geq 2$; and Formula (IV)

wherein, $R^4$ comprises the structure of Formula (II) or Formula (III); and $R^5$ comprises the structure of Formula (V) or Formula (VI):

Further embodiments of the present disclosure relate to an elastomer produced by cross-linking a chemical composition having the structure of Formula (I):

Formula (I)

wherein:

R comprises the structure of Formula (II), Formula (III), or Formula (IV):

Formula (II)

wherein, $R_1$ comprises an alkyl group and $R_2$ comprises an alkylene group;

Formula (III)

wherein, $R_3$ comprises an alkylene group in accordance with $(CH_2)_x$ with x≥2; and Formula (IV)

wherein. $R^4$ comprises the structure of Formula (II) or Formula (III); and $R^5$ comprises the structure of Formula (V) or Formula (VI).

Formula (V)

Formula (VI)

Further embodiments of the present disclosure relate to high temperature insulation comprising an elastomer produced by cross-linking a chemical composition having the structure of Formula (I):

Formula (I)

wherein:

R comprises the structure of Formula (II), Formula (III) or Formula (IV):

Formula (II)

wherein, $R_1$ comprises an alkyl group and $R_2$ comprises an alkylene group;

Formula (III)

wherein, $R_3$ comprises an alkylene group in accordance with $(CH_2)_x$ with x≥2; and Formula (IV)

wherein, $R^4$ comprises the structure of Formula (II) or Formula (III); and $R^5$ comprises the structure of Formula (V) or Formula (VI).

Formula (V)

Formula (VI)

BRIEF DESCRIPTION OF THE DRAWINGS

The following detailed description of specific embodiments of the present disclosure can be best understood when read in conjunction with the following drawings, in which.

DETAILED DESCRIPTION

Schiff bases, named after Nobel Prize winner Hugo Schiff, are compounds having the general structure $R_2C=NR'$. A bis-Schiff base refers to a compound having at least two Schiff base components in the compound. Schiff bases are known to be useful intermediates in making catalysts, dyes, and polymers for wide variety of photochemical, electronic, opto-electronic, and photonic applications.

Embodiments of the present disclosure generally relate to bis-Schiff-bases. Specifically, embodiments of the present disclosure relate to chemical compositions, polymers produced from the chemical compositions, and chemical formulations, which comprise the structure of Formula (I):

Formula (I)

where R comprises the structure of Formula (II), Formula (III), or Formula (IV).

Formula (II)

Formula (III)

Formula (IV)

The R groups of Formula (II) include $R^1$ and $R^2$. $R^1$ may comprise an alkyl group and $R^2$ may comprise an alkylene group, preferably a propylene group. Similarly, the R group of Formula (III) includes $R^3$ which may comprise an alkylene group in accordance with $(CH_2)_x$ with $x \geq 2$, preferably 2 or 4. The $R^4$ groups of Formula (IV) may comprise the structure of Formula (II) or Formula (III); and $R^5$ may comprise the structure of Formula (V) or Formula (VI).

Formula (V)

Formula (VI)

It should be understood that a "group" is used to refer to a moiety containing at least one atom. For instance, an "oxygen group" is used to refer to any moiety containing oxygen, such as a single oxygen atom or a complex arrangement containing one or many oxygen atoms.

In some embodiments, the chemical composition may be produced by reacting an amine terminated oligomer or polymer with furfural aldehyde having Formula (VII). The amine terminated oligomers or polymers may be an amine-terminated alkyl polysiloxane in accordance with Formula (VIII). In such case, the R group of Formula (I) is a siloxane oligomer or polymer moiety in accordance with Formula (II) to generate a bis-Schiff-base elastomer precursor with Formula (X). The amine terminated oligomers or polymers may be an aminobenzoate terminated linear alkyl polyether in accordance with Formula (IX). In such case, the R group of Formula (I) is an accordance with Formula (III) to generate a bis-Schiff-base elastomer precursor with Formula (XI).

Formula (VII)

Formula (VIII)

Formula (IX)

Formula (X)

Formula (XI)

The amine terminated oligomers and furfural aldehyde may be reacted in the stoichiometric ratio of about 1 to 2 in a reaction vessel. The mixture may be mixed mechanically at ambient temperature or at elevated temperature up to 150° C. Depending on the temperature of mixing, the mixing time may vary from 1 hour to 72 hours with the mixing time decreasing with a commensurate increase in temperature of mixing.

In other embodiments, the chemical composition may be produced by reacting the amine terminated oligomer (A) with furfural aldehyde (B) and an additional dialdehyde (C) such as isophthaldehyde and/or terephthaldehyde in stoichiometric ratio of A:B:C=A:2:C; where A is an integer and is ≥2; and C=A−1. Preferably, A=2, 3, 4 or 5. Reaction with an additional dialdehyde provides increased elongation capability of the formed elastomer. In such case, a bis-Schiff-base elastomer precursor with Formula (XII) is formed, wherein $R^4$ comprises the structure of Formula (II) or Formula (III); and $R^5$ comprises the structure of Formula (V) or Formula (VI), and n' can be any integers ≥1 and preferably from 1 to 4.

Formula (XII)

Further, the reaction of amine terminated oligomers and furfural aldehyde may be completed in the presence of solvent or absent solvent. Solvents may be used in conjunction with oligomers with larger molecular weights to reduce viscosity and allow the reaction to proceed. Oligomers having a molecular weight greater than 7,500 generally are used in combination with a solvent. Non-limiting examples of solvents include tetrahydrofuran (THF), ethyl acetate, butyl acetate, and isobutyl acetate.

The value of n in Formula (II) and Formula (X) may be zero or any integer equal to or greater than 1. In one or more embodiments, Formula (II) and Formula (X) comprise a value for n of at least 10. In further embodiments, n represents at least 50 repeating units, at least 200 repeating units, approximately 200 to 500 repeating units, or approximately 330 repeating units.

The value of n in Formula (III) and Formula (XI) may be any integer equal to or greater than 1. In one or more embodiments, Formula (III) and Formula (XI) comprise a value for n of at least 3. In further embodiments, n represents at least 5 repeating units, approximately 5 to 20 repeating units, or approximately 9 repeating units.

The value of n' in Formula (IV) and Formula (XII) may be any integer equal to or greater than 1. In one or more embodiments, Formula (IV) and Formula (XII) comprise a value for n' of at least 1. In further embodiments, n' represents at least 3 repeating units, approximately 1 to 10 repeating units, or approximately 5 repeating units. It will be appreciated that $R^4$ within the structures of Formula (IV) and Formula (XII) comprise the structure of Formula (II) or Formula (III) and as such the previously disclosed respective values for n may apply for Formula (II) and Formula (III).

It will be appreciated that increasing the values of n and n' result in a commensurate increase in the strain capacity or maximum elongation of the elastomer. However, the values of n and n' are limited by processing constraints as increasing the value of n also increases the difficulty in processing the resin. Conversely, it will be appreciated that decreasing the values of n and n' result in a commensurate decrease in the strain capacity or maximum elongation of the elastomer, but eases difficulty in processing the resin.

The reaction of the amine terminated oligomers and furfural aldehyde to form Formula (X), Formula (XI) and/or Formula (XII) produces byproduct water. During the reaction, the byproduct water may be removed by distillation to shift the reaction equilibrium and ensure completion of the reaction. The removal of the byproduct water may also minimize impurity in the reaction product such as unreacted furfural, diamines or aldehydes.

In some embodiments, the chemical composition may be used to produce a bis-Schiff-base elastomer. The chemical composition in accordance with Formula (X), Formula (XI) and/or Formula (XII) may undergo further cross-linking through the furan moiety facilitated by the azomethine group to produce the bis-Schiff-base elastomer.

In some embodiments, the chemical composition may be used in combination with reinforcement filler to produce a bis-Schiff-base elastomer composite. The chemical composition in accordance with Formula (X), Formula (XI), or Formula (XII) may be compounded with reinforcement filler before subsequently undergoing further cross-linking to produce the bis-Schiff-base elastomer composite.

In producing the bis-Schiff-base elastomer composite various reinforcement fillers may be added to the bis-Schiff-base elastomer precursor (the chemical composition) before thermal cross-linking and curing. The reinforcement fillers may augment properties of the neat bis-Schiff-base elastomer with improvement to modulus, char yield, and flame and erosion resistance. In various embodiments, the reinforcement fillers may comprise one or more of a nanoclay, a nanofiber, and chopped para-aramid synthetic fiber such as poly-paraphenylene terephthalamide (Kevlar®) fibers. Non-limiting examples of nanoclay include Cloisite® 30B, Cloisite® 15A, or Cloisite® 20A from BYK (Wesel, Germany), Nanomer® montmorillonite (MMT) clays from Nanocor (Hoffman Estates, Ill.). Non-limiting examples of chopped para-aramid synthetic fiber include Kevlar® Aramid pulp from E. I. du Pont de Nemours and Company (Wilmington, Del.) and nanofiber: carbon nanotubes or carbon nanofiber such as Pyrograf® from Pyrograf Products Inc (Cedarville, Ohio).

It will be appreciated that the generally low viscosity of the chemical composition in comparison to EPDM resin allows incorporation of reinforcement fillers with higher loading. Specifically, the chemical compositions of the present disclosure generally have a viscosity at 30° C. of 7,455 to 2,425,000 centiose (cP) compared to viscosity of for EPDM, which are typically much greater as in typical rubber. Viscosity of EPDM is measured using as Mooney Viscosity ML 1+4 at 125° C. and EPDM generally has a value of 18 to 70 Mooney Unit (ASTM D 1646). Additionally, the lower viscosity allows for better wetting of the reinforcement filler with the resin, resulting in stronger interface between the formed polymer matrix and reinforcement filler. The stronger interface leads to better mechanical properties of the cured elastomer composite.

In various embodiments, the reinforcement filler has a final loading in the bis-Schiff-base elastomer composite in the range of 1 wt. % to 30 wt. %, 2 wt. % to 28 wt. %, 5 wt. % to 26 wt. %, or 10 wt. % to 25 wt. %. An increased reinforcement filler loading provides increased erosion resistance and increase char yield. However, increased reinforcement filler loading also may result in an increased modulus. An increased modulus may lead to the bis-Schiff-base elastomer becoming brittle, having reduced elongation, and having reduced flexibility ultimately resulting in decreased vibration damping performance.

The cross-linking of the chemical composition to form the bis-Schiff-base elastomer and the bis-Schiff-base elastomer composite may be achieved by heating the chemical composition at an elevated temperature. In various embodiments, the chemical composition may be heated to between 120° C. and 180° C., between 130° C. and 170° C., or between 140° C. and 160° C. The heating of the chemical composition at the elevated temperature may be sustained for 4 to 16 hours (hrs), 6 to 12 hrs, or 7 to 9 hrs in various embodiments. For example, the cross-linking process may be achieved by heating the chemical composition to 180° C. for 8 hrs or 150° C. for 12 hrs. The process of heating the chemical composition converts the viscous liquid of the chemical composition to a solid elastomer material.

The bis-Schiff-base elastomer provides enhanced thermal barrier properties as evidenced by a higher char yield of the elastomer. Char yield is the weight percentage of solid material remaining at the end of pyrolysis in the elastomer or elastomer composite. The formation of a char layer on the surface insulate the substrate underneath it from further thermal exposure and protect it from erosion. In various embodiments, the bis-Schiff-base elastomer char yield at pyrolysis at 600° C. is greater than 10 wt. %, greater than 18 weight percent (wt. %), greater than 24 wt. %, greater than 40 wt. %, greater than 60 wt. %, or greater than 75 wt. %. It will be appreciated that the 600° C. char yield may be in the range of 10 to 85 wt. %, 18 to 85 wt. %, 24 to 80 wt. %, 40 to 70 wt. %, or 50 to 65 wt. %. As the char yield is affected by the pyrolysis temperature, the char yield typically decreases as the pyrolysis temperature increases. As such, in various embodiments, the bis-Schiff-base elastomer char yield at pyrolysis at 800° C. is greater than 10 wt %, greater than 17.5 wt. %, greater than 20 wt %, greater than 25 wt. %, or greater than 30 wt. %. It will be appreciated that the 800° C. char yield may be in the range of 10 to 100 wt. %, 17.5 to 100 wt. %, 18 to 50 wt. %, 22 to 40 wt. %, or 25 to 35 wt. %.

The bis-Schiff-base elastomer or polymer composite produced from the presently disclosed chemical composition may, in some embodiments, not only have improved thermal barrier qualities, but may also have advantageous thermomechanical properties as well. In some embodiments, the bis-Schiff-base elastomer or polymer composite may exhibit a glass transition temperature ($T_g$) between −40° C. and −120° C. The low $T_g$ allows the bis-Schiff-base elastomer or polymer composite to remain elastomeric even at temperatures below −40° C. Additionally the $T_g$ for the bis-Schiff-base elastomer or polymer composite provides additional benefits in toughness, vibration dampening and compliance.

The chemical composition, and its resulting bis-Schiff-base elastomer or polymer composite may be used or may be formulated for use in many industries. For example, the bis-Schiff-base elastomer or polymer composite may be used in the architecture, construction, oil and gas, mining, space, aerospace, defense, automotive, marine, or manufacturing industries.

In other embodiments, the bis-Schiff-base elastomer or polymer composite may be used to produce high temperature insulation. The thermal barrier properties, char yield, and thermal erosion properties of the bis-Schiff-base elastomer or polymer composite provide for inclusion as a high temperature insulation. For example, the bis-Schiff-base elastomer or polymer composite may be provided as an insulation material for a solid rocket motor where high temperature exposure is expected but minimization of insulation weight is a priority.

EXAMPLES

The various embodiments of the chemical compositions, bis-Schiff-base elastomers, and bis-Schiff-base polymer composites will be further clarified by the following examples. The examples are illustrative in nature, and should not be understood to limit the subject matter of the present disclosure. To further illustrate the thermal and mechanical properties of the chemical compositions, bis-Schiff-base elastomers, and bis-Schiff-base polymer composites of the present embodiments, experimental data was obtained on various embodiments of the present disclosure. Experimental data was also collected on Kevlar® filled ethylene propylene diene monomer rubber (EPDM/Kevlar) as a comparison to the current state of the art.

Inventive Example 1 comprises a bis-Schiff-base elastomer formed from the chemical composition of Formula X with a molecular weight of approximately 25,000 g/mol, which is made by reacting aminopropyl terminated polydimethylsiloxane (molecular weight of approximately 25,000) with furfural at a ratio of 1:2 in a reaction vessel with stirring at elevated temperature. Specifically, the chemical composition had a formula in accordance with $R^2$ being a n-propylene group, $R^1$ being methyl groups, and n equal to approximately 330 repeating units. The chemical composition was heated to undergo cross-linking without a reinforcement filler to produce a neat bis-Schiff-base elastomer. Cross-linking of the chemical composition was completed at 180° C. for 8 hours at 760 mmHg to generate a bis-Schiff-base elastomer.

Inventive Example 2 comprises a bis-Schiff-base elastomer formed from the chemical composition of Formula XI with a molecular weight of 872 to 1,112 g/mol, which is made by reacting poly(tetramethylene oxide)-di-p-aminobenzoate (molecular weight of approximately 710 to 950) with furfural at a ratio of approximately 1:2 in a reaction vessel with stirring at elevated temperature. Specifically, the chemical composition had a formula in accordance with $R^3$ being a n-butylene group and n equal to approximately 9 repeating units. The chemical composition was heated to undergo cross-linking without a reinforcement filler to produce a neat bis-Schiff-base elastomer. Cross-linking of the chemical composition was completed at 150° C. for 12 hours at 760 mmHg to generate a bis-Schiff-base elastomer.

Inventive Example 3 comprises a bis-Schiff-base elastomer formed from the chemical composition of Formula XII with a molecular weight of approximately 3,314 to 4,274 g/mol, which is made by reacting poly(tetramethylene oxide)-di-p-aminobenzoate (molecular weight of approximately 710 to 950), with furfural, and isophthaldehyde at a ratio of 4:2:3 in a reaction vessel with stirring at elevated temperature. Specifically, the chemical composition had a formula in accordance with $R^4$ being aminobenzoate terminated linear alkyl polyether moiety and $R^3$ being a n-butylene group with n equal to approximately 9 repeating units (i.e. a aminobenzoate terminated poly(tetramethylene oxide)), n' equal to 3 repeating units, and $R^5$ being a meta-substituted phenyl moiety. The chemical composition was heated to undergo cross-linking without a reinforcement filler to produce a neat bis-Schiff-base elastomer. Cross-linking of the chemical composition was completed at 150° C. for 12 hours at 760 mmHg to generate a bis-Schiff-base elastomer. Inventive Example 4 comprises a bis-Schiff-base polymer composite formed from the chemical composition of Formula XI with a molecular weight of 872 to 1,112 g/mol. Specifically, the chemical composition had a formula in accordance with $R_3$ being a n-butylene group and n equal to approximately 9 repeating units. Before cross-linking, the chemical composition was mixed with aramid pulp available as 544 Kevlar® pulp from FibreGlast Developments Corporation, Brookville, Ohio (15 weight percent by resin weight) and fumed silica (5 weight percent by resin weight). After an initial mix, the dispersion of the filler was ensured by passing the material through a three roll mill. Cross-linking of the chemical composition was completed at 150° C. for 12 hours at 760 mmHg to generate a bis-Schiff-base polymer composite and a final reinforcement filler weight loading of 14.3 wt. % and 4.3 wt % fumed silica. Specifically, Inventive Example 4 represents Inventive Example 2 with the addition of aramid fiber and fumed silica before cross-linking.

Comparative Example 5 comprises Kevlar® filled EPDM (EPDM/Kevlar). Specifically, Comparative Example 5 comprises EPDM with Kevlar®. Example 5 corresponds to the sample ARI-2727 from Atlantic Research Corporation as reported in Catherine A. Yezzi, Barry B. Moore, "Characterization of Kevlar/EPDM Rubbers for Use as Rocket Motor Case Insulators," AIAA-86-1489," AIAA 22nd Joint Propulsion Conference, 16-18 Jun. 1986, Huntsville, Ala.

Comparative Example 6 comprises Kevlar® filled EPDM (EPDM/Kevlar). Specifically, Comparative Example 6 comprises EPDM with 23 wt. % Kevlar®.

Figure 1:
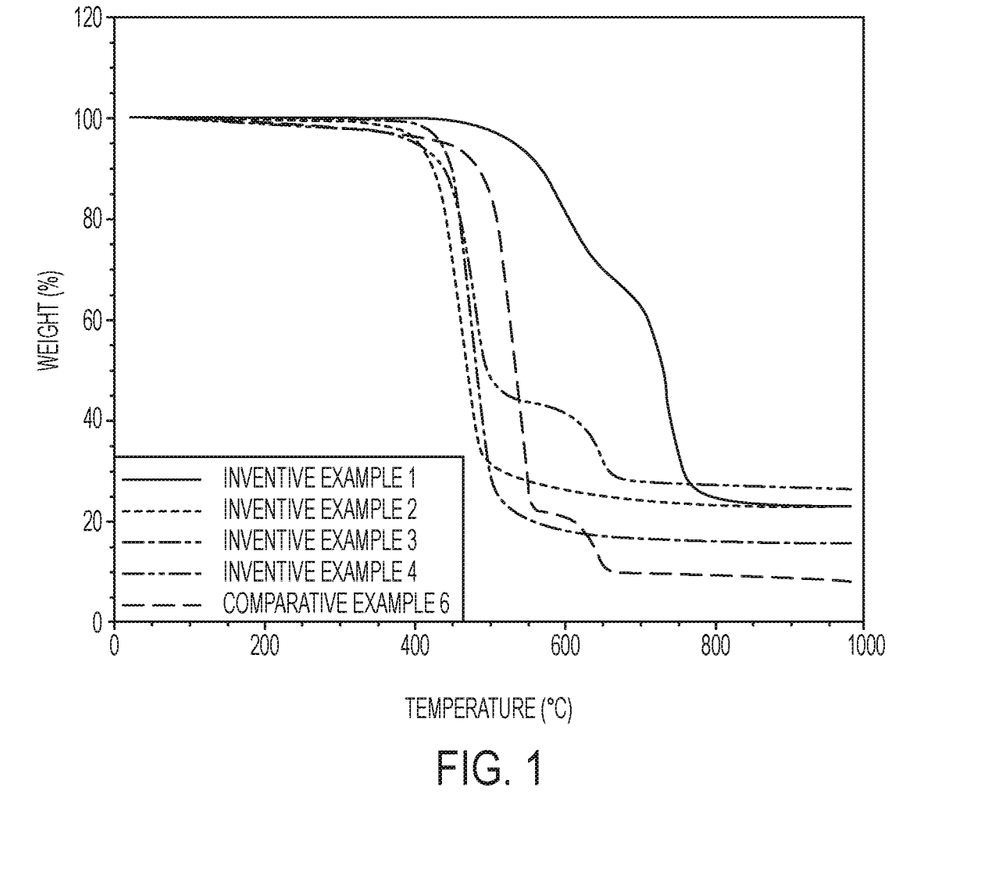
FIG. 1 is a graph showing thermogravimetric analysis (TGA) results of bis-Schiff-base elastomers according to one or more embodiments shown and described herein.

The thermal stability of the bis-Schiff-base elastomer was characterized by thermogravimetric analysis. Referring now to the Figures, FIG. 1 graphically presents a TGA of selected samples of the bis-Schiff-base elastomer, the bis-Schiff-base polymer composite, and comparative EPDM/Kevlar. Comprehensive TGA properties of the bis-Schiff-base elastomer, the bis-Schiff-base polymer composite, and comparative EPDM/Kevlar for each of Inventive Examples 1 through 4 and Comparative Examples 5 and 6 are presented in Table 1. TGA test were conducted with a TA Instruments Q5000™ thermogravimetric analyzer. A sample of approximately 10 mg was heated under a nitrogen atmosphere at a constant rate of 40° C./min to a final temperature of 1000° C. During heating the change in weight was recorded by the instrument

TABLE 1

Thermal Properties of Inventive and Comparative Examples

| Sample ID | Chemical Composition Molecular Weight, g/mol | Reinforcement Filler | Mass Loss (2%) Onset, ° C. | Char Yield, wt % @600° C. (800° C.) |
|---|---|---|---|---|
| Inventive Example 1 | 25000 | — | 494 | 81.57(23.93) |
| Inventive Example 2 | 872-1112 | — | 375 | 24.61 (22.11) |
| Inventive Example 3 | 3,314-4,274 | — | 415 | 18.25 (16.04) |
| Inventive Example 4 | 872-1112 | Kevlar/fumed silica | 293 | 41.23 (26.91) |
| Comparative Example 5 | — | Kevlar | 400 | 27 (17) |
| Comparative Example 6 | — | Kevlar | 314 | 20.78 (9.11) |

With reference to Table 1, it may be determined from the TGA data that Inventive Examples 1 through 4 (bis-Schiff-base elastomers and bis-Schiff-base polymer composites) have similar thermal stability as Comparative Examples 5 and 6 (EPDM/fillers). The similar thermal stability of the Inventive Examples and the Comparative Examples is evidenced by similar onset decomposition temperatures. However, Inventive Examples 1 through 4 exhibit significantly superior char yield (i.e. retained mass) than Comparative Examples 5 and 6, which indicates a superior thermal barrier properties. This superior char yield is especially evident at temperatures above 600° C. For example, with reference to FIG. 1, at 800° C. it may be observed that the displayed bis-Schiff-base polymer composites demonstrate a 195% increase in retained mass than the displayed EPDM/filler sample. Specifically, an increase from 9.11 wt. % for the EPDM/filler sample to 26.91 wt. % for the bis-Schiff-base polymer composite.

Table 1 also illustrates that the addition of reinforcement fillers into the bis-Schiff-base elastomer to form the bis-Schiff-base polymer composites further improves char yield, and thus the thermal barrier properties, of the elastomer materials. Specifically, as Inventive Example 4 includes the same bis-Schiff-base elastomer as Inventive Example 2, comparison of the char yield for Inventive Example 2 with Inventive Examples 4 shows the improvement in each upon introduction of the reinforcement filler.

Figure 2:
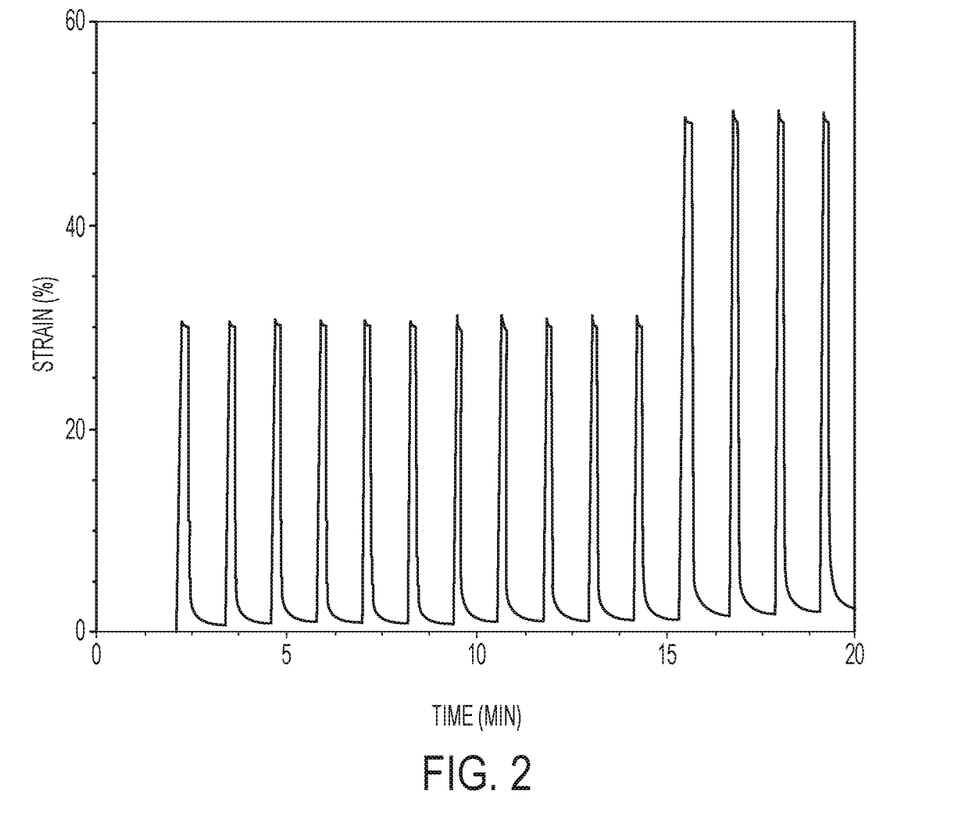
FIG. 2 is a graph showing dynamic mechanical analysis (DMA) results of a bis-Schiff-base elastomer according to one or more embodiments shown and described herein.

In addition to characterization of the thermal stability, the thermomechanical properties of disclosed bis-Schiff-base elastomer and bis-Schiff-base polymer composite were characterized. Thermomechanical properties were characterized by dynamic mechanical analysis (DMA) in accordance with ASTM D5026. The result of the DMA shows that the bis-Schiff-base elastomer (Inventive Example 1) exhibits a glass transition temperature ($T_g$) of approximately −41° C. The depressed $T_g$ allows the bis-Schiff-base elastomer to remain elastomeric even at temperatures less than −40° C. The $T_g$ also provides benefits with regards to toughness, vibration damping, and compliance when the bis-Schiff-base elastomer or bis-Schiff-base polymer composite is used in industrial applications. With reference to FIG. 2, the result of a custom strain cycling DMA test is shown to demonstrate the elastic properties and strain capacities of Inventive Example 2. The DMA test was conducted by equilibrating the elastomer at 25° C. for 2 minutes, followed by straining the sample at a strain rate of 300% per minute to 30%. The straining force was held from 0.2 minute at 25° C. followed by returning the force to zero to allow the elastomer to naturally release the strain. The test procedure was then repeated 10 times to show the repeatability of the elastic response of the sample. After the $10^{th}$ cycle, the maximum strain was increased to 50% and the strain cycling was repeated again to demonstrate the elastomer's strain capacity.

A more thorough analysis of the mass loss per exposed surface area, mass loss rate, and insulative performance to demonstrate the thermal barrier properties of bis-Schiff-base polymer composite material was performed. Specifically, Inventive Example 4 and Comparative Example 6 were subjected to a torch test corresponding to a modified ASTM-E-285-80. Samples were tested under two different heat fluxes using an oxy-acetylene test bed. The first set of tests involved a 60 second exposure to a heat flux of 350 $W/cm^2$. The second set of tests used the same exposure time of 60 seconds, but with a heat flux of 1000 $W/cm^2$. For each set of tests, three 30 millimeter (mm) by 30 mm samples were prepared for each of Inventive Example 4 and Comparative Example 6 with Type K thermocouples inserted behind the samples. Holes were drilled so that the thermocouples were 5 mm away from the test surface. An IR pyrometer was used to record the temperature at the test surface.

Comparison of Inventive Example 4 and Comparative Example 6 demonstrates the performance in terms of insulative properties on the back side of the bis-Schiff-base polymer composite opposite the oxyacetylene flame source in testing. A summary of the torch test results are provided in Table 2.

TABLE 2

Summary of Torch Test Results

| Property | Inventive Example 4 | | Comparative Example 6 | |
|---|---|---|---|---|
| | Heat Flux 350 $W/cm^2$ | Heat Flux 1000 $W/cm^2$ | Heat Flux 350 $W/cm^2$ | Heat Flux 1000 $W/cm^2$ |
| Mass Loss/Exposed Surface Area ($g/cm^2$) | 0.28 | 0.44 | 0.31 | 0.48 |
| Mass Loss Rate/Exposed Surface Area ($g/s-cm^2$) | 0.005 | 0.007 | 0.005 | 0.008 |
| Max Surface Temperature (° C.) | 1997 | 2378 | 2014 | 2485 |
| Average Surface Temperature (° C.) | 1896 | 2292 | 1954 | 2362 |
| Heat Soaked Temperature (° C.) | 182.9 | 258.7 | 195.2 | 181.7 |

With reference to Table 2, it may be seen that the mass loss per exposed area, mass loss rate, and insulative performance were superior for Inventive Example 4 when compared to Comparative Example 6, illustrating the improvement in thermal barrier properties. The mass loss per exposed surface area and mass loss rate per exposed surface area for Inventive Example 4 is quantitatively less than the losses for Comparative Example 6 in the same heat flux conditions. The mass loss per exposed surface area for Inventive Example 4 represents an approximately 9 to 10% decrease over those for Comparative Example 6. Further, the insulative performance is demonstrated as superior for Inventive Example 4 with a reduction in the maximum surface temperature, the average surface temperature, and heat soaked temperature when compared to Comparative Example 6.

Direct comparison of numerous thermal and mechanical properties of bis-Schiff-base polymer composite and EPDM/Kevlar comparative reference materials was also performed. Specifically, Inventive Example 4 and Comparative Example 5 were tested to determine thermal and mechanical properties. The heat capacity of the samples was measured using differential scanning calorimetry (DSC). The amount of the samples analyzed for the heat capacity (Cp) measurements was of 13-18.61 miligrams (mg). The samples were placed in a standard alumina DSC pan/lid and the temperature dependent DCS signal was obtained under a constant helium gas flow of 50 milliliters per minute (mL/min) with heating and cooling rates of 5 K/min in the temperature range of 50 to 300° C. for both Inventive Example 4 and Comparative Example 5. Thermal conductivity was measured using an Anter Quickline-30 thermal properties analyzer according to ASTM D5930.

The direct comparison of Inventive Example 4 with Comparative Example 5 and 6 demonstrates similar or improved results for each parameter. A summary of the thermal and mechanical properties are provided in Table 3.

TABLE 3

Comparative Thermal and Mechanical Properties

| | Comparative Example 5 | Comparative Example 6 | Inventive Example 4 |
|---|---|---|---|
| Density (g/cc) | 1.16 | 1.00 | 1.23 |
| Glass Transition (DMA, C) | NA | −34 | −41 |
| Thermal Conductivity (W/mK) | 0.363 | 0.191 | 0.292 |
| TGA (10% Mass Loss, ° C.) | 450 | 475 | 435 |
| Retained Mass 600° C. (800° C.) | ~23(~17) | 21(9) | 41(27) |
| Torch Test $I_{180}$ (s/cm) | 118 | 165 | 162 |
| Torch Test $(P_{avg})_{180}$ (s $cm^2$/g) | 101 | 164 | 132 |

TABLE 3-continued

Comparative Thermal and Mechanical Properties

| | Comparative Example 5 | Comparative Example 6 | Inventive Example 4 |
|---|---|---|---|
| Specific Heat (J/Kg-K) | 1420 | 1365 | 1743 |
| Hardness (Shore A) | 79 | 87 | 77 |
| Modulus (MPa) | 72.4 | 1777.1 | 79.7 |

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a" component includes aspects having two or more such components, unless the context clearly indicates otherwise.

Various ranges are provided for parameters throughout this disclosure. It will be appreciated and is explicitly stated that any subrange subsumed by the explicitly disclosed ranges are intended to be disclosed as well herein and are solely omitted for conciseness and brevity. For example, an explicitly disclosed range of 1 wt. % to 40 wt. % also includes 5 wt. % to 31 wt. %, 6.8 wt. % to 29.7 wt. %, and 9.13 wt. % to 26.78 wt. %.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. An elastomer produced by cross-linking a chemical composition, the chemical composition consisting of the structure of Formula (I):

Formula (I)

wherein:

R comprises the structure of at least one of Formula (II), Formula (III), and Formula (IV):

Formula (II)

wherein, $R^1$ comprises an alkyl group and $R^2$ comprises an alkylene group and n represents any integer greater than or equal to zero;

Formula (III)

wherein, $R^3$ comprises an alkylene group in accordance with $(CH_2)_x$ with $x \geq 2$ and n represents any integer greater than or equal to 1; and Formula (IV)

wherein, n' represents any integer greater than or equal to 1, $R^4$ comprises the structure of Formula (II) or Formula (III), and $R^5$ comprises the structure of Formula (V) or Formula (VI):

Formula (V)

Formula (VI)

2. The elastomer of claim 1, wherein R comprises the structure of Formula (II).

3. The elastomer of claim 2, wherein n is equal to 200 to 500, $R_1$ represents methyl groups, and $R^2$ represents a n-alkylene group.

4. The elastomer of claim 1, wherein R comprises the structure of Formula (III).

5. The elastomer of claim 4, wherein n is equal to 5 to 20 and $R^3$ represents a n-alkylene group.

6. The elastomer of claim 1, wherein R comprises the structure of Formula (IV).

7. The elastomer of claim 6 wherein n' is equal to 1 to 10, $R^4$ represents an aminobenzoate terminated linear alkyl polyether moiety in accordance with Formula (III) where n is equal to 5 to 20, $R^3$ represents a n-alkylene group, and $R^5$ represents a meta-substituted phenyl moiety in accordance with Formula (V).

8. The elastomer of claim 1, wherein the cross-linking is achieved by heating the chemical composition at 120 to 180° C. for 4 to 16 hours at approximately 760 mmHg.

9. The elastomer of claim 1, wherein the char yield at pyrolysis at 800° C. for the elastomer is greater than 10 wt. %.

10. The elastomer of claim 1, wherein the elastomer is used in at least one of an architecture, coating, construction, oil and gas, mining, defense, space, aerospace, automotive, marine, manufacturing, or electronic industries.

11. A polymer composite, the polymer composite comprising:
the elastomer of claim 1, and
one or more reinforcement fillers integrated with the chemical composition prior to cross-linking.

12. The polymer composite of claim 11, wherein the reinforcement filler comprises one or more of a nanoclay, a nanofiber, and chopped para-aramid synthetic fiber.

13. The polymer composite of claim 12, wherein the para-aramid-synthetic fiber comprises poly-paraphenylene terephthalamide fibers.

14. The polymer composite of claim 11, wherein the reinforcement filler has a final loading in the range of 1 wt. % to 30 wt. %.

15. The polymer composite of claim 11, wherein the char yield at pyrolysis at 800° C. for the polymer composite is greater than 12 wt. %.

16. The polymer composite of claim 11, wherein:
the R group of the elastomer comprises the structure of Formula (III) with wherein n equal to 5 to 20 and $R^3$ representing a n-alkylene group; and
the one or more reinforcement fillers comprise aramid fiber and fumed silica.

17. A high temperature insulation comprising an elastomer produced by cross-linking a chemical composition, the chemical composition consisting essentially of the structure of Formula (I):

Formula (I)

wherein:
R comprises the structure of at least one of Formula (II), Formula (III), and Formula (IV):

Formula (II)

wherein, $R^1$ comprises an alkyl group and $R^2$ comprises an alkylene group and n represents any integer greater than or equal to zero;

Formula (III)

wherein, $R^3$ comprises an alkylene group in accordance with $(CH_2)_x$ with x≥2 and n represents any integer greater than or equal to 1; and Formula (IV)

wherein, n' represents any integer greater than or equal to 1, $R^4$ comprises the structure of Formula (II) or Formula (III), and $R^5$ comprises the structure of Formula (V) or Formula (VI):

Formula (V)

Formula (VI)

18. The high temperature insulation of claim 17, wherein the high temperature insulation further comprises one or more reinforcement fillers integrated with the chemical composition prior to cross-linking to form a polymer composite, the reinforcement filler selected from nanoclays, nanofibers, and chopped para-aramid synthetic fibers.

19. The high temperature insulation of claim 17, wherein the high temperature insulation material is configured for use as solid rocket motor insulation.

* * * * *